(12) United States Patent
Wegner

(10) Patent No.: US 6,296,006 B1
(45) Date of Patent: Oct. 2, 2001

(54) SYSTEM AND METHOD FOR SEALING LEAKS IN VESSELS

(75) Inventor: John W. Wegner, Moreno Valley, CA (US)

(73) Assignee: Koppl Company, Inc., Montebello, CA (US)

( * ) Notice: Subject to any disclaimer, the term of this patent is extended or adjusted under 35 U.S.C. 154(b) by 0 days.

(21) Appl. No.: 09/037,776

(22) Filed: Mar. 10, 1998

(51) Int. Cl.$^7$ .............................. F16K 43/00; F16L 55/16; F16L 55/175

(52) U.S. Cl. .................................. 137/15.11; 137/315.01; 137/312; 156/94; 156/295; 156/493; 138/98; 138/99

(58) Field of Search ...................... 73/40.5 R, 46, 73/49.1, 49.2 R, 49.1 T, 49.8; 137/315.01, 312, 15.08, 15.11; 138/93, 97, 98, 99; 220/561; 156/94, 295, 493; 285/97; 29/402.08, 402.09

(56) References Cited

U.S. PATENT DOCUMENTS

| | | | | |
|---|---|---|---|---|
| 2,002,577 | * | 5/1935 | Ice | 138/99 |
| 2,492,507 | * | 12/1949 | Tipton | 138/99 |
| 2,571,236 | * | 10/1951 | Hamilton, Jr. | 73/46 |
| 3,043,342 | * | 7/1962 | Graham | 138/99 |
| 3,141,478 | * | 7/1964 | Copeland | 138/99 |
| 3,350,050 | * | 10/1967 | Buczala et al. | 138/99 |
| 3,480,043 | * | 11/1969 | Proudfoot et al. | 138/99 |
| 3,496,963 | * | 2/1970 | Bardgette et al. | 138/99 |
| 3,500,841 | * | 3/1970 | Logan | 137/312 |
| 3,563,276 | * | 2/1971 | Hight et al. | 138/99 |
| 3,984,942 | | 10/1976 | Schroth | 49/477 |
| 4,049,296 | * | 9/1977 | Harrison | 138/99 |
| 4,086,806 | | 5/1978 | Covey, III et al. | 73/46 |
| 4,355,000 | | 10/1982 | Lumelleau | 376/205 |
| 4,441,278 | | 4/1984 | Covey, III | 49/477 |
| 4,518,015 | | 5/1985 | Fischer | 138/90 |
| 4,582,451 | | 4/1986 | Hollander, Jr. | 405/105 |
| 4,756,337 | * | 7/1988 | Settineri | 138/99 |
| 4,920,706 | | 5/1990 | Fischer | 52/2 B |
| 4,932,441 | | 6/1990 | Corey et al. | 138/93 |
| 5,143,568 | * | 9/1992 | Sheahan | 73/40.5 R |
| 5,251,472 | | 10/1993 | Carlson et al. | 73/46 |
| 5,283,979 | | 2/1994 | Carlson et al. | 49/395 |
| 5,333,916 | * | 8/1994 | Burkit et al. | 138/99 |
| 5,423,932 | * | 6/1995 | Schinabeck | 156/94 |
| 5,500,064 | * | 3/1996 | Schinabeck | 156/94 |
| 5,629,065 | * | 5/1997 | Schinabeck | 428/63 |
| 5,732,743 | | 3/1998 | Livesay | 138/99 |

* cited by examiner

Primary Examiner—George L. Walton
(74) Attorney, Agent, or Firm—Christie, Parker & Hale, LLP

(57) ABSTRACT

A system and method are disclosed for sealing leaks in electrical insulators and other equipment without the need for depressurizing that equipment. The system and method may be readily adapted to seal any joint, regardless of its configuration. In addition, while the system and method provide an effective and sure seal, the seal may be readily removed in order to change out the leaking component at a future date. A tubular seal is maneuvered into position to encircle the leaking joint. A reinforcing layer is applied over the seal. The seal is then filled with sealant under pressure. The seal isolates the sealant and its direct hydraulic pressure from the operating components to prevent the sealant from contacting those components, while simultaneously providing sufficient force against the leaking joint to stop the leak.

17 Claims, 8 Drawing Sheets

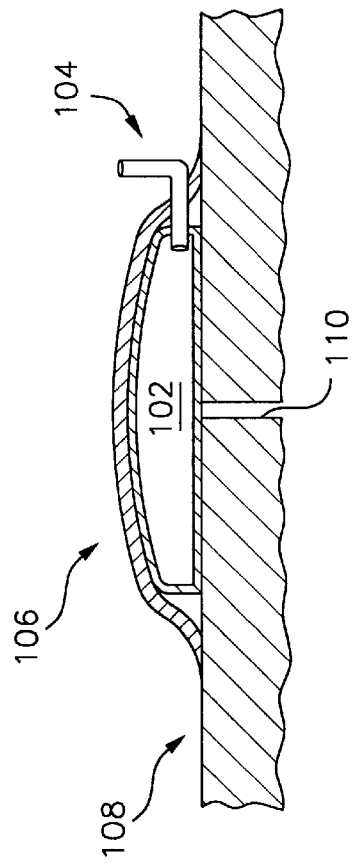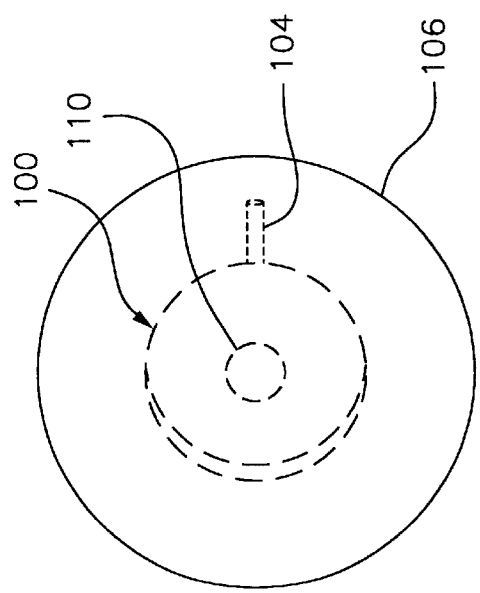

SYSTEM AND METHOD FOR SEALING LEAKS IN VESSELS

BACKGROUND OF THE INVENTION

1 Field of the Invention

The present invention relates to systems and methods for sealing leaks. More particularly, the invention relates to a system and method for sealing leaks in vessels containing hazardous coolants, insulants, and other potentially harmful compounds.

High voltage electrical equipment, such as large circuit breakers and transformers, include conductors that are typically encased in an insulator, also known as a bushing assembly, which comprises one or more sections of cylindrical porcelain pipe that surround the high voltage conductors. The sections of pipe define respective joints at the pipe interfaces which are sealed with compression seal o-rings and the like. The insulators are often filled with inert, non-conductive gasses and/or oils for cooling and insulating purposes. One such gas is sulfur hexafluoride ($SF_6$).

While $SF_6$ is quite effective as an insulant, the gas also suffers from at least one significant shortcoming. It has been found that $SF_6$, if it escapes from its containment and is released into the atmosphere, depletes the ozone layer. Therefore, the gas has been targeted by the Environmental Protection Agency (EPA), and strict regulations have been imposed on its use, both in the United States and throughout the world. Moreover, $SF_6$ has recently become very expensive. Therefore, a leak is not only an environmental concern, but can also be very costly.

Some high voltage electrical equipment, in particular transformers and some circuit breakers, utilize "transformer oil", which is a mineral oil that is an effective insulant and coolant for the electrical equipment. However, transformer oil also has drawbacks, one being that it degrades gaskets, o-rings, and seals, often causing them to leak. Transformer oil, if allowed to leak for continued periods of time, is potentially damaging to the environment as well.

Others have attempted to solve the above-described leaks with various methods and devices. One proposed method was to simply ignore the leak until the electrical equipment could be taken off line, removed from the site, transported to a repair facility, and repaired by disassembling the bushing and replacing the leaking seal. Typically, the amount of time that elapsed before such action was taken was on the order of decades. Not only is this method very burdensome and expensive, but with increasing environmental concerns and strict regulations, this method is no longer feasible, as an $SF_6$ leak may no longer be ignored for such an extended period of time.

Yet another method practiced by others in the past was to depressurize the electrical equipment, apply a layer of silicone caulk or the like onto the outside of the leaking joint, repressurize the electrical equipment, and put it back into service. This method rarely, if ever, works because often the surface of the equipment cannot be properly prepared in the field, and thus the caulk does not bond sufficiently well to the insulator surface. In addition, the caulk often does not have sufficient inherent strength or bonding strength to withstand the stresses resulting from the pressurized gas trying to escape, and therefore the caulk fails after a relatively short operating life. Furthermore, such a method suffers from the shortcoming that the electrical equipment must be fully depressurized for a period of time while the caulk is applied and allowed to cure.

Still another proposed method is to apply a layer of caulk or the like to the joint, and then apply a reinforcing layer over the caulk. However, the caulk still tends to fail as a result of differences in the coefficient of thermal expansion between the caulk and the leaking surface, such that during the first thermal swing (usually the same day), the caulk either cracks or debonds, thereby destroying the seal.

Yet another method involves the fabrication of a close-fitting housing that encloses the leaking joint. The housing is constructed with a passageway extending fully around the leaking joint, directly over the joint and opening toward it. Thus, once the housing is in place over the leaking joint, a pump is connected to the housing and sealant is pumped into the passageway. The sealant is pressurized to a level higher than the pressure of the leaking fluid. The wall of the leaking components and the walls of the housing serve to hold the sealant in place until it cures.

While this method has proven somewhat effective at sealing the leak, it has a number of shortcomings. In the first place, the sealant actually adheres the opposite sides of the leaking joint together, which makes it more difficult to take the joint apart at some later date in order to perform a permanent repair of the leaking joint. In addition, leaking joints typically have different configurations and different dimensions. Even similar joints on the same equipment often have significant dimensional differences. Thus, each joint requires a specially configured housing, which is obviously burdensome, inefficient, and expensive. Furthermore, because the sealant is pressurized to a level higher than that of the leaking fluid, the sealant may actually be forced into the electrical component through the leak itself, which can result in a dangerous equipment failure.

In addition, the assignee of the rights in the present invention proposed a method and system marketed under the name "Power Band 1". The method involved wrapping plural turns of tape about the leaking joint, with a number of small tubes extending from beneath the tape to the atmosphere to allow $SF_6$ gas passing through the leaking joint to escape from under the tape so that the tape properly lays down over the joint. A composite layer is placed over the tape, and the small tubes are crimped. While this method has enjoyed success, it has been found that the small tubes often leak. In addition, the method requires precision in laying down the tape.

Accordingly, it will be apparent to those skilled in the art that there continues to be a need for a system and method that effectively stops leaks without the need for depressurizing the equipment. Furthermore, there exists a need for such a system and method that can be readily adapted in the field to stop a leak in any joint, regardless of the dimensions of that joint. The present invention addresses these needs and others.

SUMMARY OF THE INVENTION

Briefly, and in general terms, the present invention provides a system and method for sealing leaks in vessels such as electrical insulators without the need for depressurizing the associated equipment. The system and method may be readily adapted in the field to seal any joint, regardless of its dimensions. In addition, while the system and method provide an effective seal, the seal may be readily removed when desired in order to change out the defective, original equipment o-ring or gasket. In accordance with one embodiment of the invention, a tubular seal is maneuvered into position to encircle the leaking joint. A reinforcing layer is applied over the seal. The seal is then filled with sealant under pressure, and the sealant is preferably allowed to cure inside the seal. Thus, the seal isolates the sealant from the electrical components to prevent the sealant from coming into direct contact with the electrical components, while simultaneously providing sufficient force against the leaking joint to stop the leak.

Thus, the system of the present invention in one preferred embodiment comprises: an inflatable seal adapted to cover the leak, the seal defining an interior chamber and including an inlet in communication with the chamber; a reinforcing layer adapted to be applied over the seal; and a quantity of sealant adapted to be delivered into the chamber through the inlet.

In an alternative embodiment of the invention, the seal comprises a segment of extruded tubular rubber stock including first and second ends adapted to be adhered together to form a circular seal encircling a leaking joint.

In a preferred embodiment, the method of the present invention comprises the steps of: positioning a tubular seal about a vessel over a leak, the seal defining an interior chamber and including an inlet in communication with the chamber; placing a reinforcing layer over the seal; and introducing an amount of a sealant into the chamber through the inlet.

Other features and advantages of the present invention will become apparent from the following detailed description, taken in conjunction with the accompanying drawings which illustrate, by way of example, the features of the present invention.

DESCRIPTION OF THE DRAWINGS

FIG. 8 is a cross-sectional view of an alternate embodiment of the sealant system; and FIG. 9 is a top plan view, partially in phantom, of the sealant system of FIG. 8.

DETAILED DESCRIPTION OF THE PREFERRED EMBODIMENTS

Figure 1:
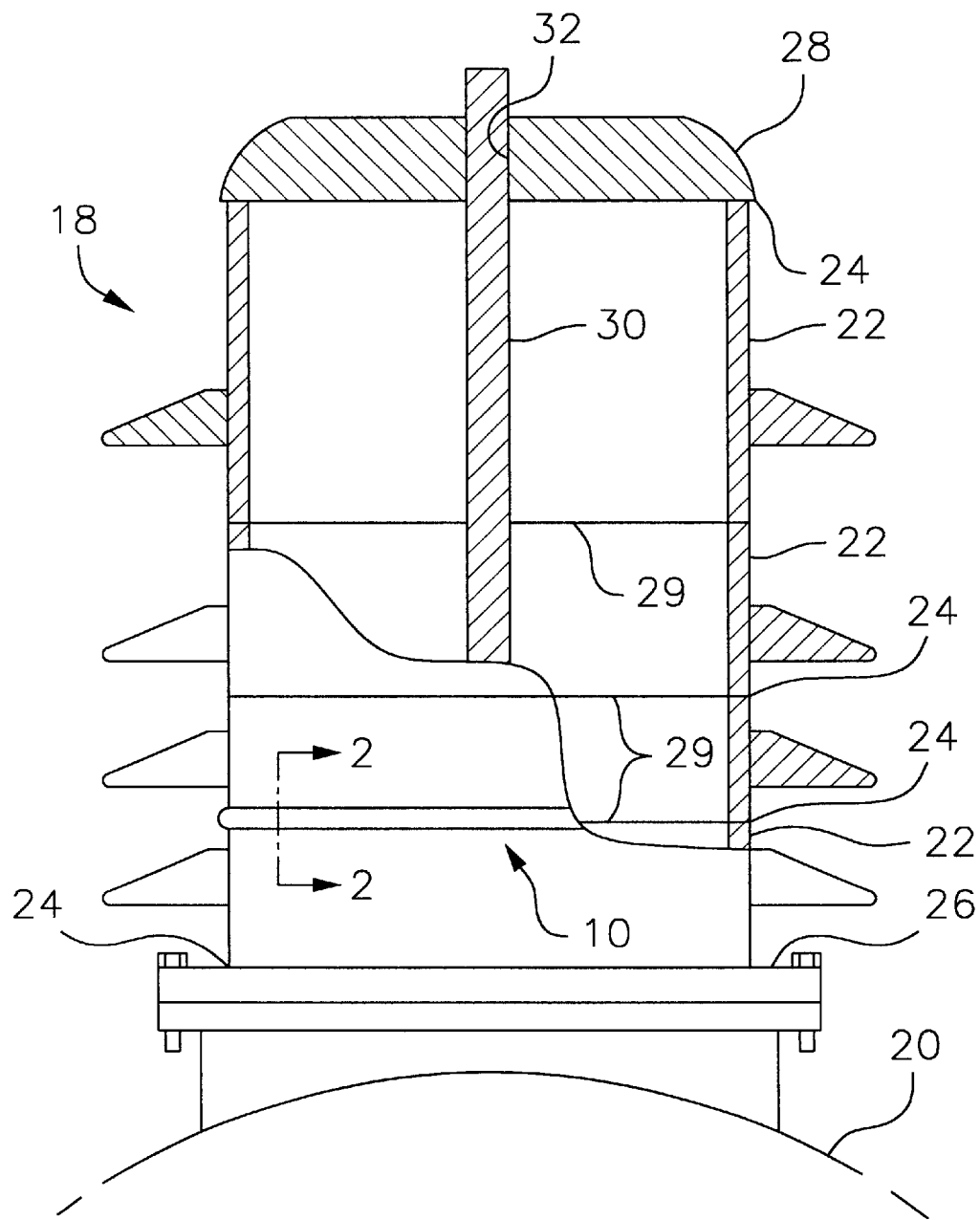
FIG. 1 is a partially sectioned front elevational view of a high voltage circuit breaker incorporating an insulating bushing and having a sealant system embodying the present invention in place over a leaking joint.

In the following detailed description, like reference numerals will be used to refer to like or corresponding elements in the different figures of the drawings. Referring now to the drawings, and particularly to FIG. 2, there is shown a sealant system 10 comprising a preferred embodiment of the invention. The sealant system comprises, generally, a strip of barrier tape 12, an inflatable seal 14, and a reinforcing layer 16. The sealant system is operative to plug a leaking joint of a vessel, for example an insulative bushing 18 of a high voltage electrical device 20 such as a circuit breaker (FIG. 1).

Figure 2:
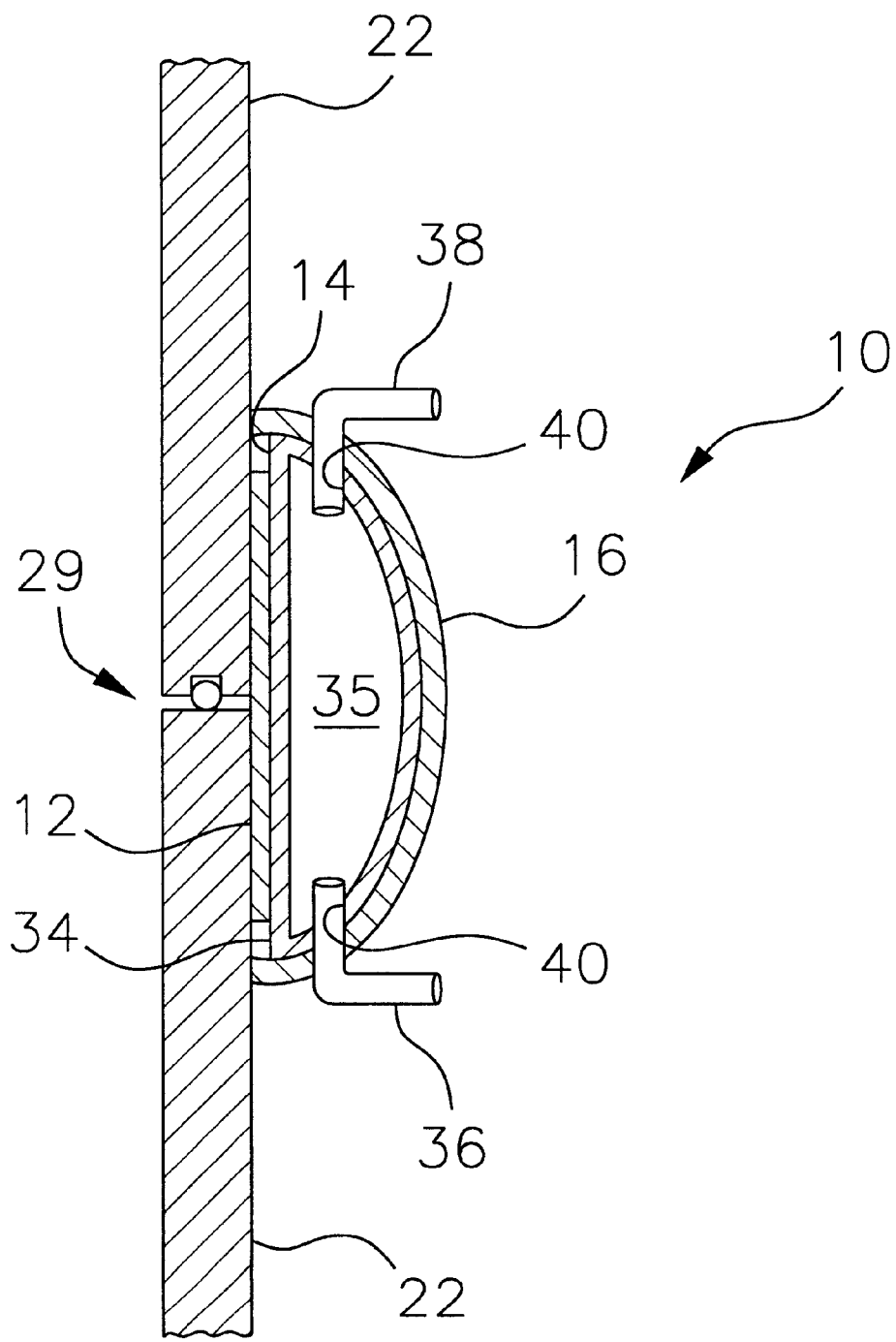
FIG. 2 is a fragmented cross-sectional view, in enlarged scale, taken along the line 2—2 of FIG. 1.

Referring to FIG. 1, the bushing assembly 18 of the high voltage electrical device 20 is illustrated to show one possible application of the sealant system 10 of the present invention. The bushing assembly comprises plural porcelain pipe segments 22 that define joints 24 between the respective pipe segments. The porcelain pipe assembly includes a lower end connected to a metal connector flange 26 of the circuit breaker device. The lower end of the pipe assembly and the flange define a joint therebetween as well. The pipe assembly further includes an upper end connected to a metal cap 28, with the upper end and metal cap also defining a joint therebetween.

The joints between the respective porcelain pipe segments 22, between the metal cap 28 and the porcelain pipe, and between the connector flange 26 and the porcelain pipe are all common leak sites. The joints are typically sealed by compression seal o-rings 29, gaskets, and the like. Over time, the o-rings, gaskets, or other seals can deteriorate and begin to leak, for example from normal aging, or from prolonged exposure to transformer oil which tends to degrade the seals. The sealant system of the present invention is operative to stop such leaks, as is described in greater detail below.

The circuit breaker 20 includes an electrical conductor 30 extending through the pipe segments 22 of the bushing assembly 18 and through a central opening 32 formed in the metal cap 28. The pipe segments define an interior compartment that contains pressurized $SF_6$ gas (or, alternatively, transformer oil). The compartment is bounded at the lower end by the connector flange 26, and at the top by the metal cap 28. Thus, as described above, as one or more of the o-rings and/or gaskets deteriorate, the compartment is no longer air-tight and $SF_6$ gas (or transformer oil) may escape from the compartment and into the atmosphere, creating an unacceptable environmental hazard. In that event, the sealant system 10 may be used to stop the leak, as is now described.

Figure 3:
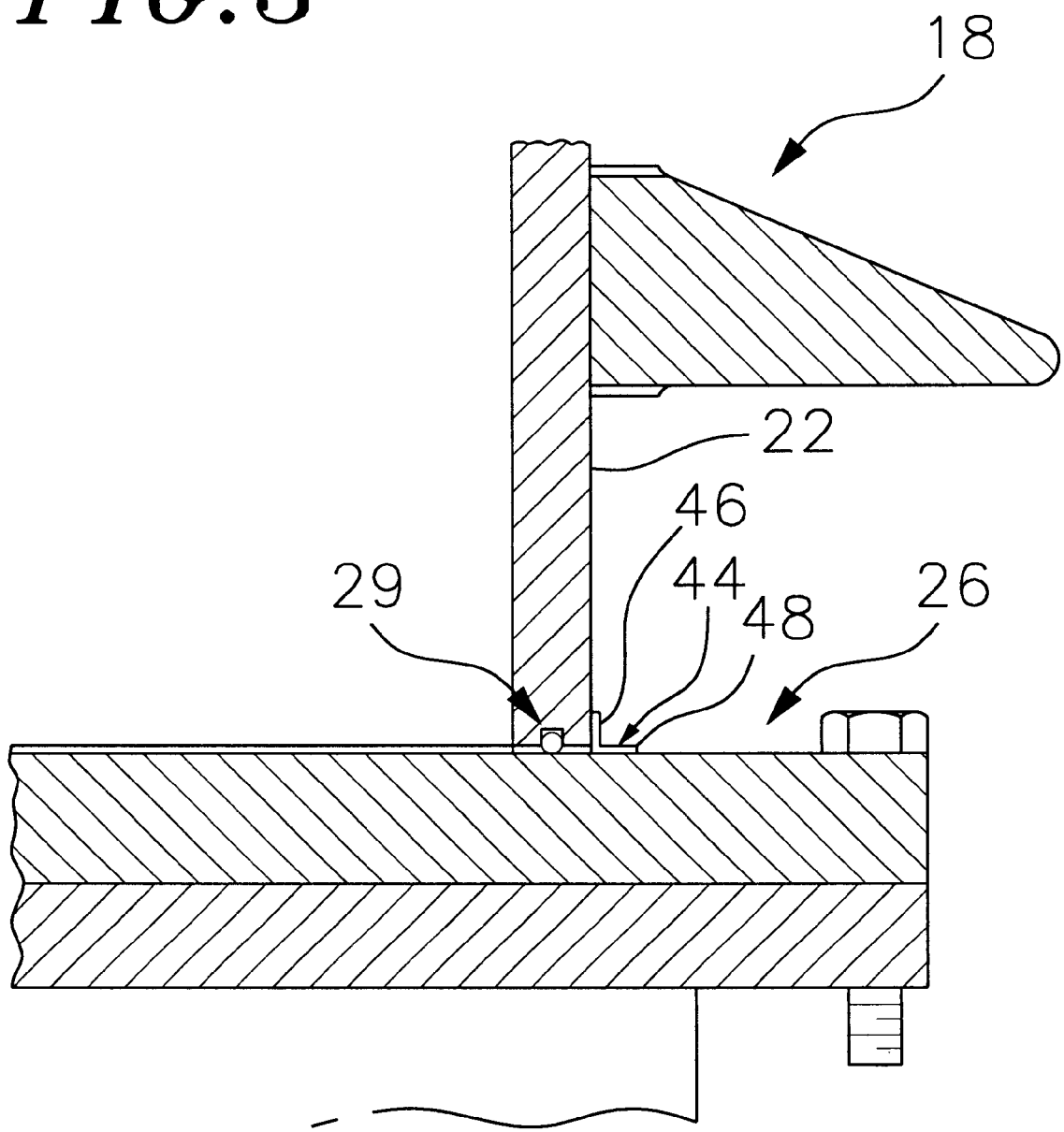
FIG. 3 is a fragmented cross-sectional view showing a strip of barrier tape placed over the leaking joint.

As described above, in a preferred embodiment the sealant system 10 includes the strip of barrier tape 12 (FIGS. 2 and 3). The barrier tape serves as a joint bridge between two adjacent segments of porcelain pipe 22, or between the porcelain pipe and metal cap 28 or metal connector flange 26. The barrier tape preferably comprises high strength tape, composite sheeting, engineering plastic, or the like, and preferably is formed with a preselected length such that it only extends about a portion of the periphery of the bushing assembly. The barrier tape is preferably applied at a location along the joint away from the actual leak, as described in greater detail below. In order to ensure a strong connection, the surface of the bushing assembly may be prepared in a well known manner, and a sealant may be applied to the surface. The barrier tape is then laid over the sealant. In the event a portion of the leak is aligned with the barrier tape, once the barrier tape is securely in place, the leak will be diverted to a path of less resistance, allowing the barrier tape to properly bond to the surface of the bushing.

Figure 6:
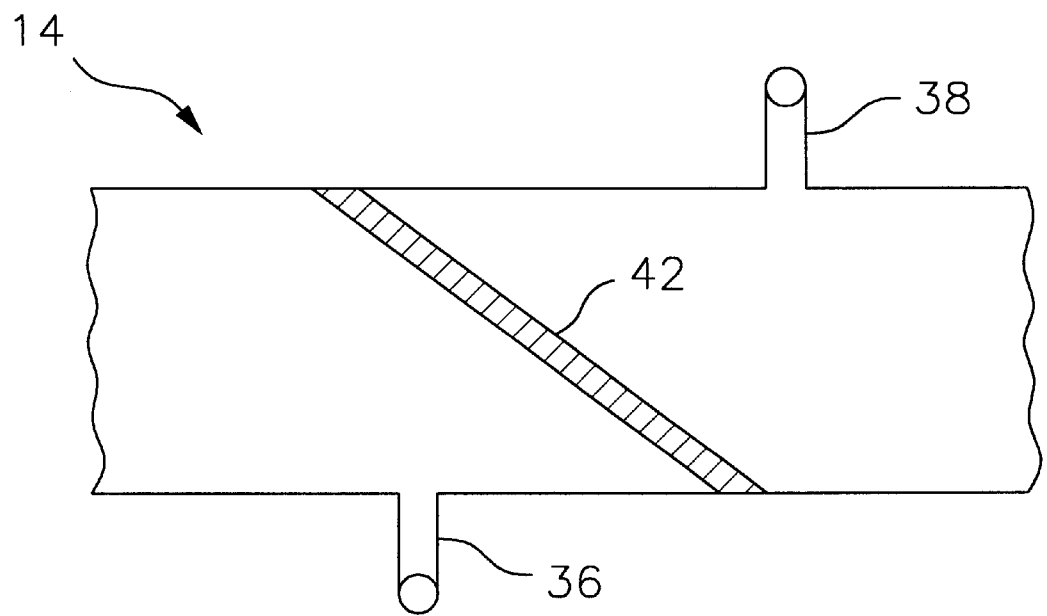
FIG. 6 is a fragmented front view of the seal of the sealant system of the present invention in place over a leaking joint.

Referring now to FIGS. 2 and 6, there is shown the inflatable seal 14. In one embodiment, the seal is formed of extruded tubular rubber stock with a cross-sectional shape selected to complement that of the leaking joint so as to make a suitable connection with the surface of the bushing assembly 18. In a preferred embodiment, the seal has a generally D-shaped cross-section, with the straight side 34 bearing against the surface of the bushing assembly over the leaking joint 24. In order to form the seal, the circumference of the bushing assembly at the leaking joint is measured, and a corresponding length of rubber stock is bias-cut and extended about the leaking joint to make a relatively tight fit about the leaking joint. The open ends of the rubber stock are then preferably adhered together in any well known manner to form a seal joint. Alternatively, the ends may be cold butted together, vulcanized together, joined by a mechanical joiner or plug inserted into each end, joined by extending a joining collar over the two ends, or any other well known manner for attaching the two ends together in a fluid-tight arrangement. This results in a hollow, annular seal with an interior passageway or chamber 35 adapted to receive a sealant.

In one embodiment, a layer of pressure-sensitive adhesive (not shown) is applied to the joint-contacting surface of the seal 14, in order to adhere the seal to the adjacent pipe segments 22 of the bushing assembly 18 and ensure that the seal remains in proper position over the leaking joint 24.

In the preferred embodiment, the seal 14 further includes an L-shaped filler tube 36 and an L-shaped vent tube 38, each of which extends through an opening 40 in the seal wall and into the chamber 35 for communication therewith. The filler tube is configured for engagement with a source of sealant (not shown) to deliver sealant into the chamber. The vent tube is provided for evacuating displaced air from the chamber. Alternatively, the seal 14 could simply be formed with the pair of openings 40, one of which could be engaged by the sealant delivery device while the other opening remains unengaged to serve as the vent.

While in the preferred embodiment the seal 14 includes one filler tube 36 and one vent tube 38, the seal could be formed with only a filler tube, or with plural filler tubes and plural vent tubes, or any such combination.

Because the filler tube 36 is located adjacent the vent tube 38 in the preferred embodiment, a portion of the sealant being injected into the chamber 35 through the filler tube may actually extrude through the vent tube before all or most of the air inside the chamber has been evacuated. To avoid this, a thin rubber membrane 42 may be interposed between the ends of the seal (FIG. 6). Accordingly, the sealant being introduced into the chamber must travel through the entire chamber before it reaches the vent tube. In that manner, substantially all of the air inside the chamber is displaced before any sealant escapes through the vent tube.

The sealant used to fill the seal 14 may take many different forms, such as a curing or non-curing sealant, for example a fast-setting, low exothermic thermoset polymer. Alternatively, the sealant could comprise water, grease, or virtually any liquid.

Referring to FIG. 2, the composite reinforcing layer 16 is applied over the seal 14 to provide strength and support for the seal, while being sufficiently flexible to bend in complex angles and offer significant strain relief. Preferably, the reinforcing layer comprises the combination of a reinforcement and a matrix applied to the reinforcement, such as a fiberglass layer. The reinforcement may take many different forms, such as a woven substrate, fiber tape, fiber fabric, metal window screen, and the like. In one preferred embodiment, the reinforcement comprises a fiberglass yarn that is aligned and stitched together. The matrix may likewise take many different forms, such as a simple adhesive, for example glue, or more complex compositions such as a liquid metal matrix. Preferably, the matrix is a highly toughened (nearly elastomeric) epoxy, as it provides sufficient strength, ease of application, minimal health risk, and controllable cure, while being relatively economical. Alternatively, the reinforcing layer may comprise a channel shaped metal band capable of assuming a circular configuration to back the seal 14.

The reinforcing layer 16 not only holds the seal 14 in place, but also confines the seal and controls any differential thermal expansion problems that may otherwise be experienced with the seal 14. The reinforcing layer is the backing for the seal and forces the seal radially inwardly against the leaking joint 24 to seal the leak. Furthermore, the reinforcing layer provides a long useful life, maintains a low profile, and is relatively easy to clean and maintain.

The composite reinforcing layer 16 is preferably allowed to cure, which may occur in several different ways. One is to simply allow the reinforcing layer to cure at room temperature. However, a preferred method is to thermally cure the reinforcing layer with portable heater bands and controllers, as is well known in the art.

In addition, the reinforcing layer 16 may be subjected to compression, for example mechanical pressing, in order to force air out of the composite and to press the reinforcement and matrix tightly together. Alternatively, the reinforcing layer may be encapsulated in plastic sheeting and a vacuum established inside the sheeting to allow the air pressure to force the sheet down onto the composite reinforcing layer, thereby forcing the reinforcing layer down onto the seal.

In a preferred embodiment, a protective, UV-blocking paint or polymer is applied over the reinforcing layer 16 (not shown), because many of the matrix materials used in the reinforcing layer, as well as some fiber reinforcements, are susceptible to UV rays, as well as to ozone and common urban pollutants.

The sealant system 10 may include plural thermocouples or temperature indicating pills, tags, or similar devices (not shown), with those devices disposed at spaced apart locations into, around, and on the seal 14 and reinforcing layer 16, so that the curing temperatures may be monitored.

Referring now to FIG. 2, a preferred method of assembling the sealant system 10 will be described. Initially, the strip of barrier tape 12 is applied over the leaking joint 24, preferably at a location spaced from the actual leak, as described above. The circumference of the leaking joint is measured, and a corresponding length of the rubber stock is cut to size, and the pair of openings 40 formed in the tube. Next, the filler and vent tubes 36 and 38 are inserted into the respective openings 40. The rubber stock is maneuvered into position about the circumference of the leaking joint. Preferably, this is achieved by wrapping the rubber stock about the joint and attaching the two ends of the rubber stock together, as described above, in order to form the annular seal 14.

Next, the reinforcing layer 16 is applied over the seal 14 and allowed to cure, again as described above. In a preferred embodiment, the reinforcing layer and the seal are cooled down after the thermal cure step to the operating temperature of the component being repaired and are held at that temperature during the sealant injecting step.

The seal 14 is then filled with a sealant by connecting the source of sealant (not shown) to the filler tube 36 and injecting pressurized sealant into the chamber 35, while the air in the chamber is displaced from the chamber and out through the vent tube 38. It is not crucial that all of the air be displaced from the chamber; in fact, in some instances it is preferable to trap some air in the sealant. As the pressurized sealant is injected into the chamber, the trapped air bubbles will be compressed. After the sealant cures, not only will the reinforcing layer 16 force the seal down onto the leaking joint, the compressed air bubbles will provide an auxiliary pressure against the leaking joint 24.

As the sealant is injected into the seal 14, the hydraulic pressure within the seal is preferably raised to and maintained at a controlled pressured, such as 10 psi above the pressure inside the bushing assembly 18. In the preferred embodiment, the sealant is curable, and thus the next step is to allow the sealant to cure. Once the sealant has cured, the pressure providing pump can be disconnected from the filler port 36 without any plug or valve being required to seal that port. If any of the components of the sealant system 10 should happen to stress crack in the future, the sealant will remain in place and continue to cover the leaking joint. In the case of a non-curing sealant, a pair of caps, plugs, or the like are engaged with the respective tubes 36 and 38 to seal off the tubes. Alternatively, the tubes can be pinched, crimped, shut off by a bead or a valve, or sealed by any other suitable method.

Once the seal 14 is completed, the protective layer is preferably applied over the reinforcing layer 16 to prevent the reinforcing layer from being exposed to UV rays. The sealant system 10 is then completed, and is effective to prevent further leaking through the covered joint 24.

Preferably, during the assembly of the sealant system 10, a quantity of air or other gas is maintained inside the seal 14 as the reinforcing layer 16 is applied over it, to prevent the chamber 35 from collapsing as the reinforcing layer is applied, thereby ensuring that the chamber extends about the periphery of the joint 24. This may be accomplished by simply capping the filler and vent tubes 36 and 38, or by any other suitable method.

In an alternative method, a bead of sealant is circumferentially applied directly to the leak in the leaking joint 24 before the barrier tape 12 is applied. When subjected to the forces of the inflated seal, this bead of sealant plugs the leak at its source, lowering the pressure-induced load against the entire sealant system 10. Such direct contact of sealant to the leaking joint is compatible with the spirit of this invention, because the type of sealant used and the small quantity applied would prevent the sealant from being forced into the leaking system, nor would it result in the opposite sides of the leaking joint being adhered together. Therefore, such a method does not suffer from the same shortcomings as do the prior art methods mentioned above in the Background section.

While the sealant system 10 has been primarily described for use with a bushing assembly containing $SF_6$, it will be apparent to those of ordinary skill in the art that the sealant system may also be used to stop leaks in insulators that contain transformer oil or any other fluid or gas, as well as to stop gas or liquid leaks in fluid-handling components, or to stop vacuum leaks in those components. In addition, the sealant system may be used to add structural stability to component joints, for example as a seismic reinforcement.

Referring now to FIG. 3, there is shown another typical leaking joint 24 in an electrical insulator, namely between the metal connector flange 26 and the lowest pipe segment 22. The sealant system 10 of the present invention is also suitable for sealing a leak in such a joint, as is now described.

Referring to FIG. 3, a strip of barrier tape 44 is applied over the joint, with a segment 46 thereof being connected to the porcelain pipe segment 22 and extending in a vertical direction, and a segment 48 thereof being connected to the connector flange 26 and extending in a horizontal direction. As with the embodiment described above, the barrier tape extends only partially about the circumference of the joint, and is preferably adhered to the bushing assembly 18 at a location spaced from the actual leak site, as with the previously described embodiment.

A seal 50 is provided and is extended about the periphery of the joint. The seal is preferably formed from extruded tubular rubber stock, similar to the embodiment described above. In this embodiment, however, the rubber stock has a generally wedged or triangular cross-sectional shape (FIG. 4) for making positive contact with both the porcelain pipe segment 22 and the connector flange 26. It will thus be apparent that the seal may take many different forms to complement the configuration of the insulator at the site of the leaking joint. In fact, in each of the specifically disclosed embodiments the rubber stock may initially be circular in cross section, if desired, and achieve the cross-sectional shapes described above only when applied to the device being sealed.

Figure 4:
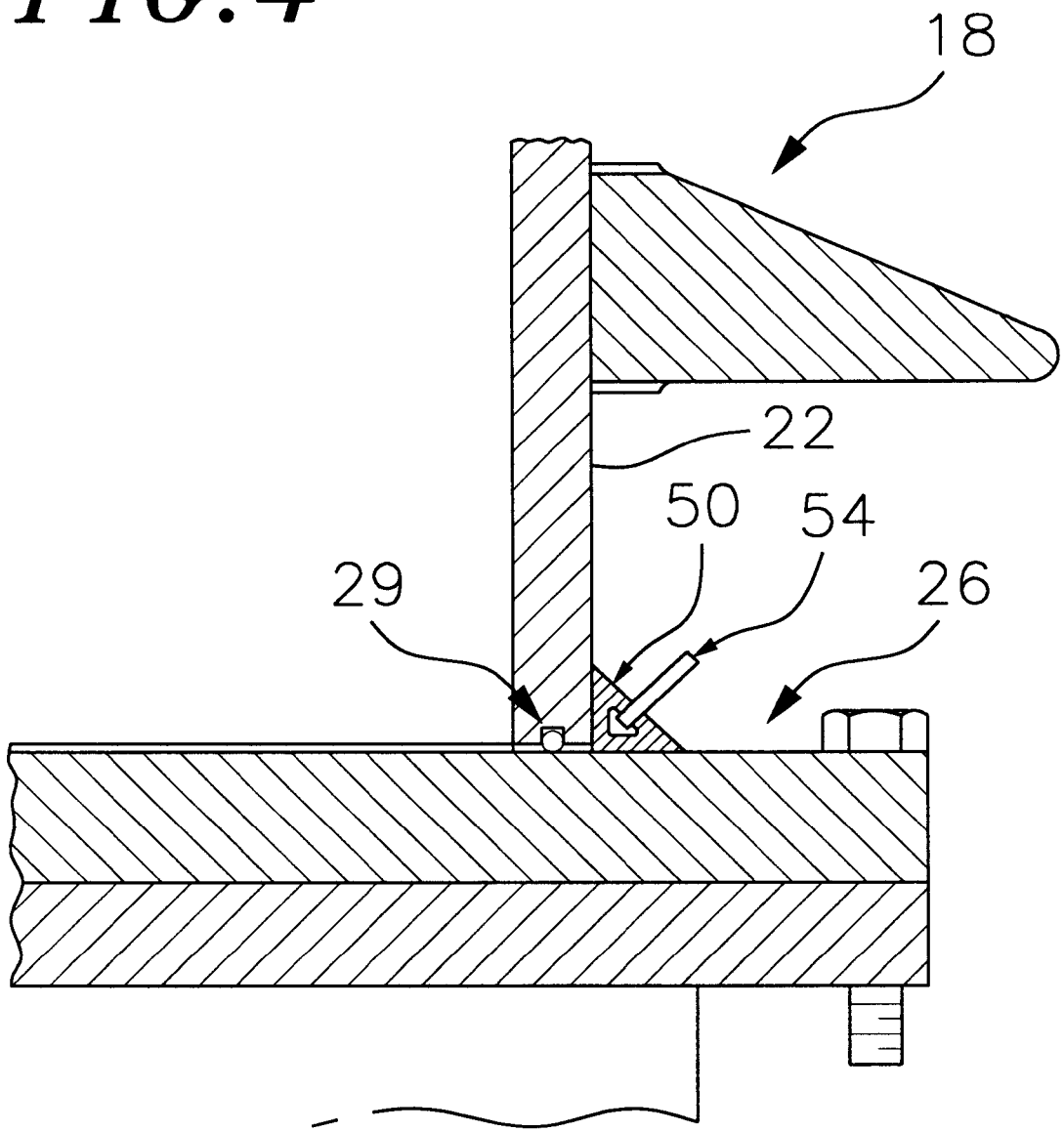
FIG. 4 is a fragmented cross-sectional view similar to FIG. 3 and showing a tubular seal in place encircling the leaking joint.
Figure 5:
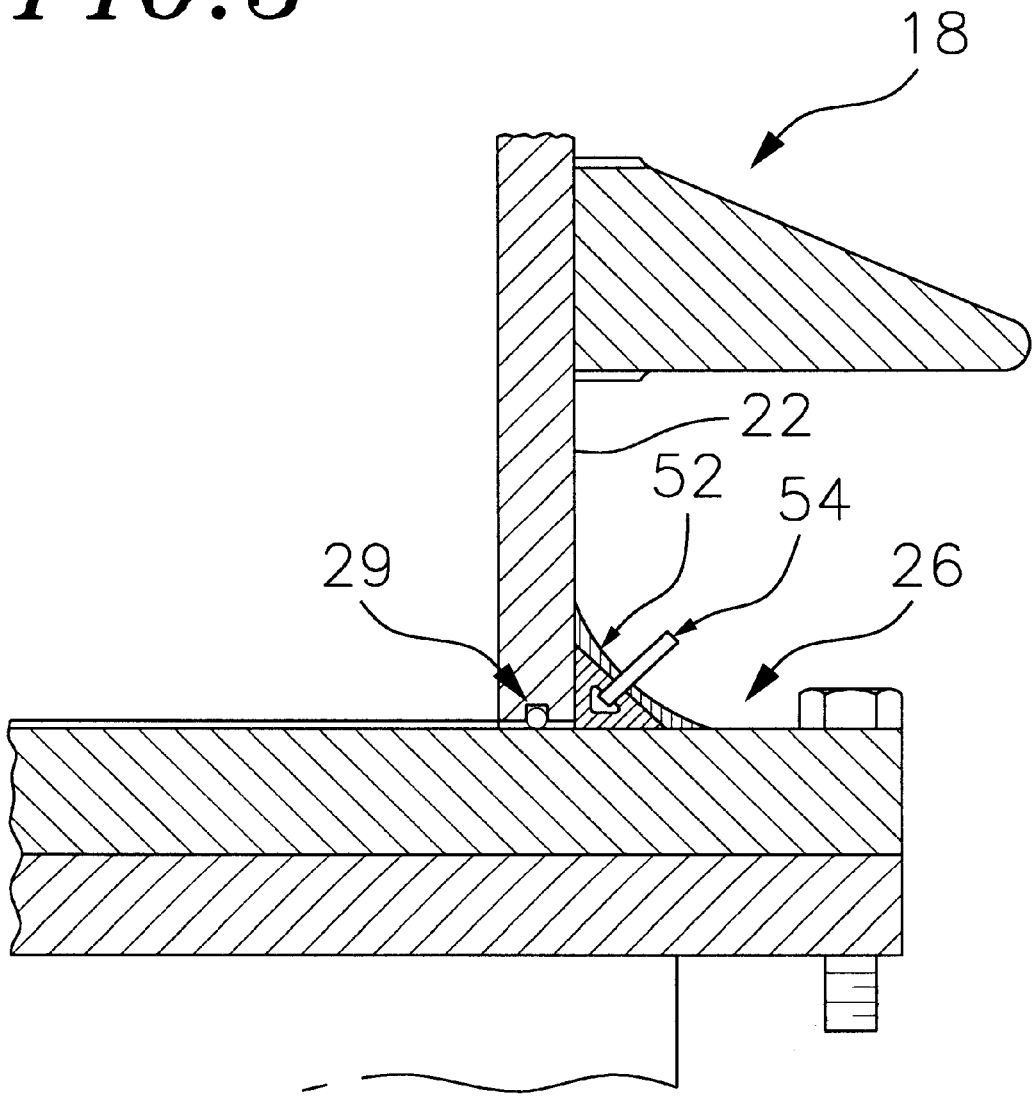
FIG. 5 is a fragmented cross-sectional view similar to FIG. 4 and showing a reinforcing layer placed over the seal.

In the alternative embodiment of FIGS. 3 and 4, a composite reinforcing layer 52 is applied over the seal 50 (FIG. 5) so that the layer bonds to both the porcelain pipe segment 22 and connector flange 26. The seal is injected with sealant through a filler tube 54 while displaced air is evacuated through a vent tube (not shown).

Figure 7:
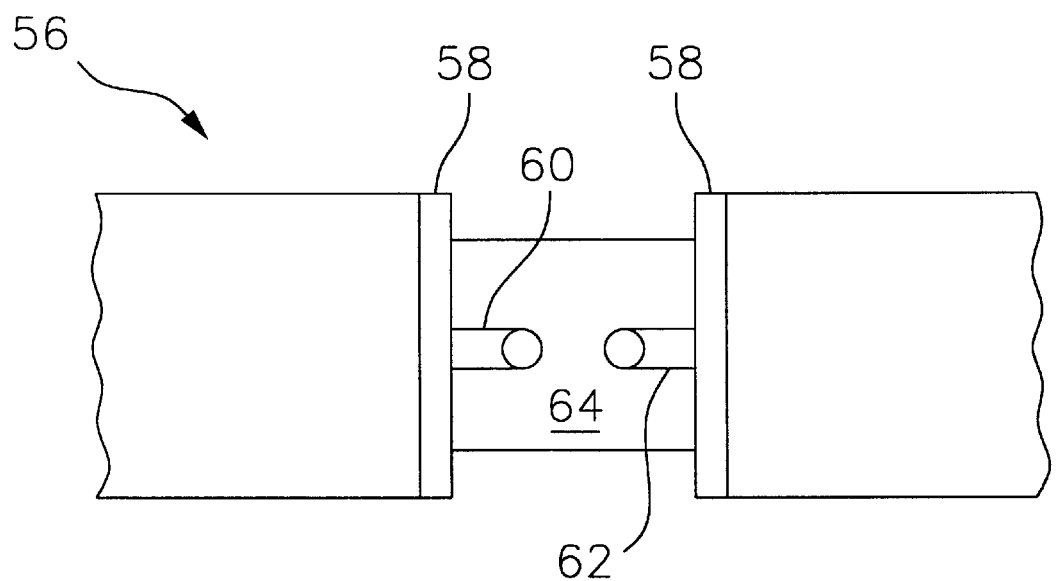
FIG. 7 is a view similar to FIG. 6 and showing an alternate embodiment of the seal.

Referring to FIG. 7, there is shown an alternate method of constructing a seal 56. Rather than attaching the two ends together to form an annular seal, the ends are separately sealed, preferably with plugs 58 inserted into the respective open ends and adhered to the seal. The filler and vent tubes 60 and 62 extend through the respective plugs, or may be extended into the seal adjacent the respective ends of the seal. In this embodiment, the injected sealant will be forced to travel through the entire chamber until it reaches the vent tube, and thus there is no concern that the sealant will be prematurely ejected through the vent tube. Because the seal does not extend about the entire periphery of the joint, the strip of barrier tape 64 is preferably placed over that portion of the joint not covered by the seal. As with the above-described embodiments, a reinforcing layer (not shown) is applied over the seal to keep the seal in place over the leaking joint and force the seal radially inwardly against the leaking joint.

Referring now to FIGS. 8 and 9, there is shown an alternative embodiment of the sealant system of the present invention. A disk-shaped, inflatable seal 100 in the form of a pillow is provided (shown in phantom in FIG. 9) and includes an interior chamber 102. A filler tube 104 includes an open first end disposed inside the chamber and an open second end disposed outside the chamber for injecting pressurized sealant into the chamber. A reinforcing layer 106 is applied over the seal and is connected to the bushing assembly 108 by an adhesive matrix or the like. Alternatively, the reinforcing layer can be bolted down onto the bushing assembly, or connected in any other suitable manner. Such a system is used to seal small cracks or holes 110 and the like in fluid containing assemblies that are not associated with a joint between two pipe segments. While the seal is shown having a disk shape, it will be apparent that the seal could assume virtually any shape, so long as the seal defines an interior chamber to receive a quantity of sealant.

From the foregoing, it will be apparent that the sealant system 10 provides a reliable, efficient system for sealing leaks in electrical insulators and other vessels. The sealant system does not require that the leaking component be depressurized, nor does the system require that a unique part be machined to accommodate the configuration of a leaking joint.

While forms of the invention have been illustrated and described, it will be apparent to those skilled in the art that various modifications and improvements may be made without departing from the spirit and scope of the invention. As such, it is not intended that the invention be limited, except as by the appended claims.

What is claimed is:

1. A system for sealing a leak in a vessel, the system comprising:
    an inflatable seal disposed over the leak, the seal defining an interior chamber and including a sealant inlet and an air outlet spaced apart on the seal;
    a reinforcing layer disposed over the seal to hold it against the vessel; and
    a quantity of curable sealant delivered into the chamber through the inlet under pressure to inflate the seal and expel any air within the seal through the air outlet.

2. The system of claim 1 for use with a leak in a joint of the vessel and further including:
    segment of tape placed over a portion of the joint;
    the seal having a joint positioned over the tape.

3. The system of claim 1 wherein:
    the seal comprises a segment of extruded tubular plastically deformable stock including first and second ends adapted to be adhered together.

4. A system for sealing a leak in a vessel, the system comprising:
    an inflatable seal disposed over the leak, the seal defining an interior chamber and including a sealant inlet and an air outlet in communication with the chamber on the seal;
    a reinforcing layer disposed over the seal to hold it against the vessel; and
    a quantity of sealant delivered into the chamber through the inlet under pressure to inflate the seal and expel any air within the seal through the air outlet;
    the reinforcing layer comprising a curable composite including a reinforcement and a matrix.

5. The system of claim 3 and further including:
    a membrane connected to the first and second ends to prevent the flow of sealant therebetween.

6. The system of claim 4 wherein:
    the curable composite comprises a combination of a fabric substrate and an epoxy matrix.

7. The system of claim 1 for sealing a crack in the vessel and wherein:
    the seal comprises a pillow placed over the crack.

8. A method of sealing a leak in a vessel, comprising the steps of:
    positioning an inflatable seal over the leak, the seal including an interior chamber and an inlet in communication with the chamber;
    applying a reinforcing layer over the seal; and
    introducing an amount of a curable sealant into the chamber under pressure through the inlet as air is expelled through an outlet on the seal.

9. The method of claim 8 and further including the step of:
    applying a segment of tape to the vessel at a location spaced from the leak prior to positioning the seal.

10. The method of claim 8 for sealing a leaking joint and wherein:
    the step of positioning comprises placing a tubular seal about the periphery of the leaking joint.

11. The method of claim 10 wherein:
    the step of positioning comprises selecting a segment of tubular rubber stock including first and second ends, wrapping the rubber stock around the vessel, and attaching the first and second ends together.

12. A method of sealing a leak in a vessel, comprising the steps of:
    applying a bead of sealant over the leak;
    positioning an inflatable seal over the leak, the seal including an interior chamber and an inlet in communication with the chamber;
    applying a reinforcing layer over the seal; and
    introducing an amount of a sealant into the chamber under pressure through the inlet as air is expelled through an outlet on the seal.

13. The method of claim 9 wherein the seal includes a joint, and the step of positioning comprises positioning the joint of the seal over the tape.

14. The method of claim 8 and further including the step of:
    compressing the reinforcing layer inwardly toward the seal.

15. A system for sealing a leak in a generally cylindrical portion of a vessel, the system comprising:
    an inflatable, tubular seal about the periphery of the vessel, the seal defining an interior chamber and including an inlet and an outlet spaced apart and in communication with the chamber;
    a reinforcing layer comprising a curable composite adapted to be applied over the seal and adhered to the vessel as air is expelled; and
    a sealant adapted to be delivered into the chamber through the inlet to inflate the seal about the vessel.

16. The system of claim 15 for use with a leak defined by a joint in the vessel and further including a segment of tape adapted to be placed over a portion of the joint.

17. A system for sealing a leak in a generally cylindrical portion of a vessel, the system comprising:
    an inflatable, tubular seal placed about the periphery of the vessel, the seal defining an interior chamber and including an inlet and an outlet spaced apart and in communication with the chamber;
    a reinforcing layer applied over the seal and adhered to the vessel;
    a sealant delivered into the chamber through the inlet to inflate the seal about the vessel as air is expelled through the outlet; and
    the reinforcing layer comprises a fabric substrate and an epoxy matrix.

* * * * *